(12) United States Patent
Lee

(10) Patent No.: US 6,319,149 B1
(45) Date of Patent: Nov. 20, 2001

(54) GOLF CLUB HEAD

(76) Inventor: Michael C. W. Lee, Ever Ring Industry Co., Ltd. No. 82-12 San Lung Rd., Ta Liao Hsiang, Kaohciung (TW)

( * ) Notice: Subject to any disclaimer, the term of this patent is extended or adjusted under 35 U.S.C. 154(b) by 0 days.

(21) Appl. No.: 09/129,865

(22) Filed: Aug. 6, 1998

(51) Int. Cl.[7] .............................. A63B 53/04; B23K 31/10
(52) U.S. Cl. ..................... 473/342; 473/345; 473/349; 473/409; 228/125; 228/162; 29/527.4
(58) Field of Search ..................................... 473/324, 329, 473/332, 342, 345, 346, 349, 350, 409, 344, 334, 335; 228/125, 162, 175, 177; 29/527.4

(56) References Cited

U.S. PATENT DOCUMENTS

| | | |
|---|---|---|
| D. 369,392 | 4/1996 | Adams et al. . |
| 3,975,023 | * 8/1976 | Inamori . |
| 4,465,221 | * 8/1984 | Schmidt . |
| 5,056,705 | * 10/1991 | Wakita . |
| 5,219,408 | * 6/1993 | Sun . |
| 5,398,929 | * 3/1995 | Kitaichi . |
| 5,403,007 | * 4/1995 | Chen . |
| 5,431,396 | 7/1995 | Shieh . |
| 5,447,311 | * 9/1995 | Viollaz . |
| 5,501,459 | * 3/1996 | Endo . |
| 5,505,453 | 4/1996 | Mack . |
| 5,536,006 | * 7/1996 | Shieh . |
| 5,540,436 | * 7/1996 | Boone . |
| 5,564,994 | 10/1996 | Chang . |
| 5,584,770 | * 12/1996 | Jensen . |
| 5,669,825 | 9/1997 | Shira . |
| 5,743,813 | 4/1998 | Chen et al. . |
| 5,993,329 | * 11/1999 | Shieh . |

FOREIGN PATENT DOCUMENTS

| | | |
|---|---|---|
| 0577056 | 1/1994 | (EP) . |
| 6261960 | 9/1994 | (JP) . |
| 6261961 | 9/1994 | (JP) . |

* cited by examiner

*Primary Examiner*—Sebastiano Passaniti
(74) *Attorney, Agent, or Firm*—Richard C. Litman

(57) ABSTRACT

An improved golf club head constructed having a hitting face or cushioned insert, crown and a sole. An interlocking bridge is formed between the crown and hitting face to reduce vibrations upon impact with a golf ball. Various metals are used in the construction and are joined together at the sole for perimeter weighting or balancing of the golf club head.

10 Claims, 6 Drawing Sheets

GOLF CLUB HEAD

BACKGROUND OF THE INVENTION

1. Field of the Invention

The present invention relates generally to golf club heads. More specifically, the invention is an improved golf club head constructed of various metals which minimize structural problems directly related to the club head performance.

2. Description of the Related Art

Various golf club heads have been devised for improving the performance of different styles of golf club heads via distinct structural designs. The present invention relates closely to the construction of golf club metalwood heads at least. A metalwood head is usually a hollow spherical shape comprising a hitting face, a crown, and a sole plate. The typical metalwood is formed through a lost wax casting process where the crown and face are combine in a single entity. A sole plate cast separately is then welded to the shell so formed.

Metalwood heads can also be formed through a forging process where the individual components of the golf head are formed separately and then welded to form a single entity. Whether cast or forged, metalwood heads are usually made of a single base metal or metal alloy such as stainless steel, titanium or aluminum.

Advances made in metallurgy have allowed golf club head manufactures to combine two or more metals in the construction of both metalwoods and iron heads. It is quite common nowadays to come across metalwood heads that are made of a stainless steel shell (i.e crown and sole) and a titanium hitting face and or metalwoods that are made of an aluminum and a titanium hitting face. The advantages of combining different metals and metal alloys in the construction of both metalwood heads and irons is that designers are given the freedom to use the physical and chemical properties of the metals in the construction to improve weight distribution, increase the moment of inertia, and improve structural strength of the golf club head at least. These and other improvements in the construction of the golf club heads through the use of two or more different metals will usually result in more forgiving golf clubs that are both accurate and longer off the tee. The conventional method by which one or metals are used to construct golf club heads are known. However, a golf club head which is weighted for balance and has a hitting face made of a combination of soft and hard metals which significantly reduces vibration throughout the club upon impact with a golf ball is lacking.

For example, U.S. Pat. No. 5,431,396 issued to Shieh discloses a golf club head assembly which includes a hollow shell having a loop-like shock absorbing member, a second loop-like structure for blocking the passage through a front opening of the hollow shell, and a striking plate fitted into a front recess via mechanical screws in combination with adhesives. Mechanical screws have a tendancy to retract or fail over time from cyclical impact. In addition, more than two ring-like structures add to the over all weight of the club. This increase in weight on the front face of the club is known to contribute to unwanted rotations of the club head at the point of impact with a golf ball which produces undesirable golf ball trajectories off the tee.

U.S. Pat. No. 5,505,453 issued to Mack discloses a tunable golf club head configured in a similar fashion to that Shieh, except that the striking plate is adjustable or tunable via a plurality of tension springs or belleville washers. This style of club head is primarily a training club.

U.S. Pat. No. 5,564,994 issued to Chang discloses a golf club head having a single titanium face plate welded to die sections located within the shell of the club head. This is a conventional club head without the benefits of vibration dampening and perimeter weighting as herein described by the instant invention. U.S. Pat. No. 5,743,8130 issued to Chen et al. teach a similar club head construction, but the construction has some vibration damping features.

U.S. Pat. No. 5,669,825 issued to Shira discloses a method of making golf club heads which comprises forming one or more components of the golf club head from sintered metal powders and then joining the components via welding, brazing, or diffusion or adhesive bonding. The golf club heads taught by Shira are produced without regard for vibration effects and perimeter weighting for metalwoods in particular. U.S. Design Pat. No. 369,392 issued to Adams et al. diagrammatically illustrates a metalwood type golf club without any apparent disclosure of the unique features as taught herein by the instant invention.

Other documents such as Foreign Patents by McCabe (EP 0577056), Yamashita (JP 6261960) and Tsuchiya (JP 6261961) are of general relevance to the instant invention. The patent by Yamashita, in particular, discloses methods of deep cold processing and aging hardness at various temperatures for shaping club heads.

The golf club head of the instant invention is different from the related art, in that it provides a club head which attenuates vibrations and reduces rotations upon impact with a golf ball via the unique cushioned face and perimeter weighting technique respectively. Thus, none of the above inventions and patents, taken either singularly or in combination, is seen to describe the instant invention as claimed. Thus a golf club head solving the aforementioned problems is desired.

SUMMARY OF THE INVENTION

The golf club head according to the invention relates to the construction of an improved golf club head metalwood having a hitting face or cushioned insert, crown and a sole. An interlocking bridge is formed between the crown and hitting face to reduce vibrations upon impact with a golf ball. Various metals are used in the construction and are joined together at the sole for perimeter weighting or balancing of the golf club head.

Accordingly, it is a principal object of the invention to provide a golf club head which attenuates mechanical vibrations upon impact with a golf ball.

It is another object of the invention to provide a golf club head which reduces rotations upon impact with a golf ball.

It is a further object of the invention to a golf club head which is weighted to the comfort of a particular user.

Still another object of the invention is to provide a golf club head with reduced weight requirements.

Further still, another object of the invention is to provide a golf club head with improved durability under cyclical impact.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to an improved golf club head for metalwoods and irons. The preferred embodiments of the present invention are depicted in FIGS. 1–12, and are generally referenced by numeral 13.

Figure 1:
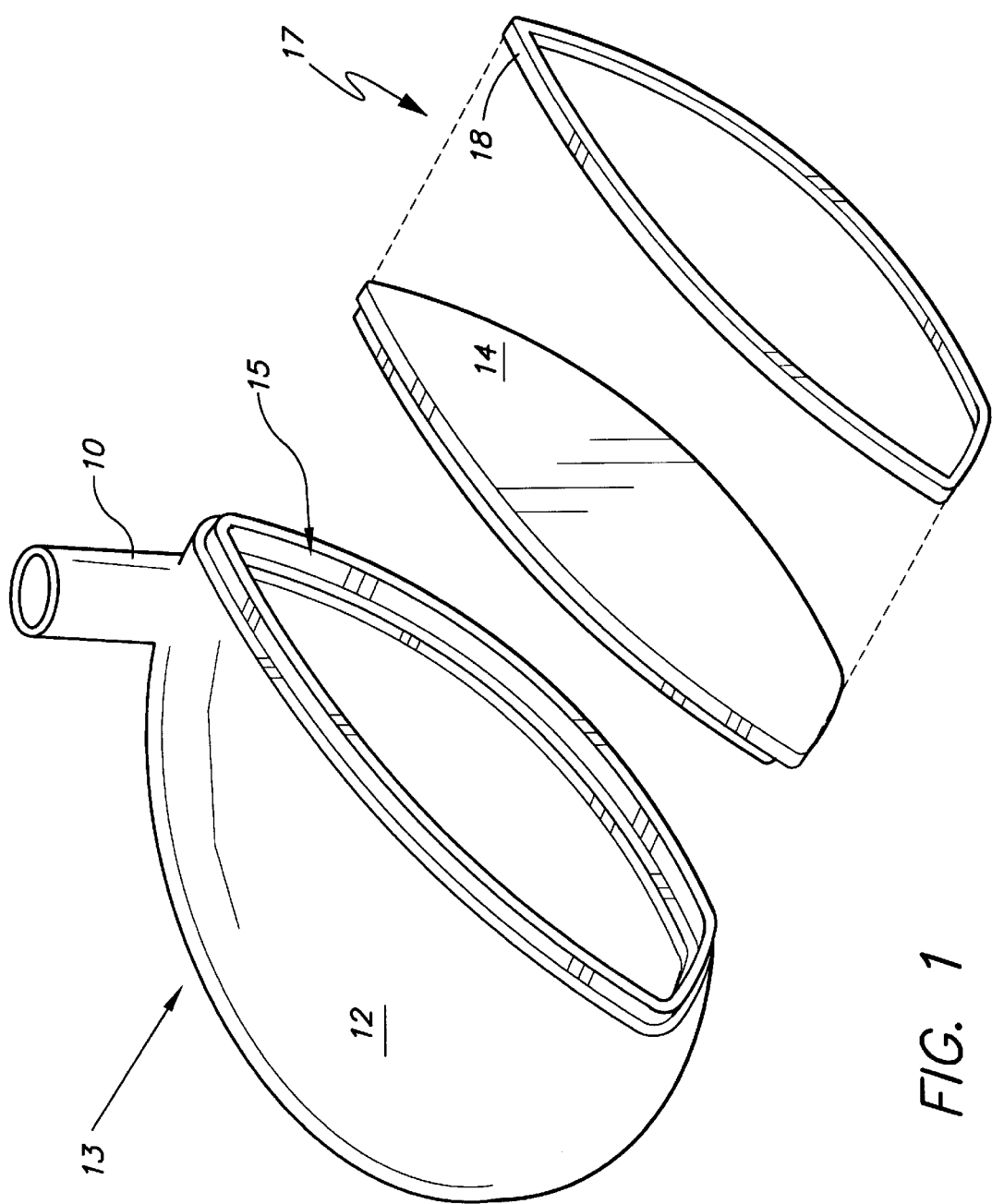
FIG. 1 is an exploded perspective view of a golf club head according to the present invention.

As best seen in FIG. 1, the golf club head 13 according to the invention comprises a hosel 10, a shell 12 with a recess 15, a striking face-plate 14, a sole 16 and a single loop-like ring 18 for encasing attachment with the striking face-plate 14. The striking face-plate 14 is formed within the loop-like ring 18 and inserted within an opening 20 or crown 22 of the shell 12. The ring 18 fully isolates the striking face-plate 14 from the shell 12, and serves as an expansion joint between the shell 12 and face-plate 14. The ring 18 is preferably made of a soft metal material such as copper, brass, aluminum or similar metal material.

The face-plate 14 and ring encasement or package (see FIGS. 2, 4 and 6) is mechanically sealed or welded to the shell 12 and produces a cushioned effect which attenuate vibrations upon impact with a golf ball. Further machining (or brazing) and surface treatment of the inserted face-plate and encased ring provides a wedded attachment of the combination ring 18 and face plate-plate 14 to the shell 12 to form a single entity. The face-plate 14 is preferably made of a hard metal material such as maraging steel, stainless steel, titanium or similar material for withstanding cyclical impacts from a golf ball.

The cushioned effect is produced by two different metals laying adjacent to each other either in vertical or horizontal planes and a third softer metal shaped to conform to the contours of the intersecting planes. The softer metal is recessed to allow both hard and soft metals to mechanically lock around the softer metal thereby forming a bridge having at least one metal element interlocked and sealed within the face of the shell 12. A compressing force is applied to the softer metal through a press forming process which causes the softer metal to expand forming a strong mechanical bond. The interlocking between the different metals is completed by a bridge formed between metals of the same composition by welding, which causes the softer metal to be encapsulated along intersecting planes to form an expansion joint.

Figure 8:
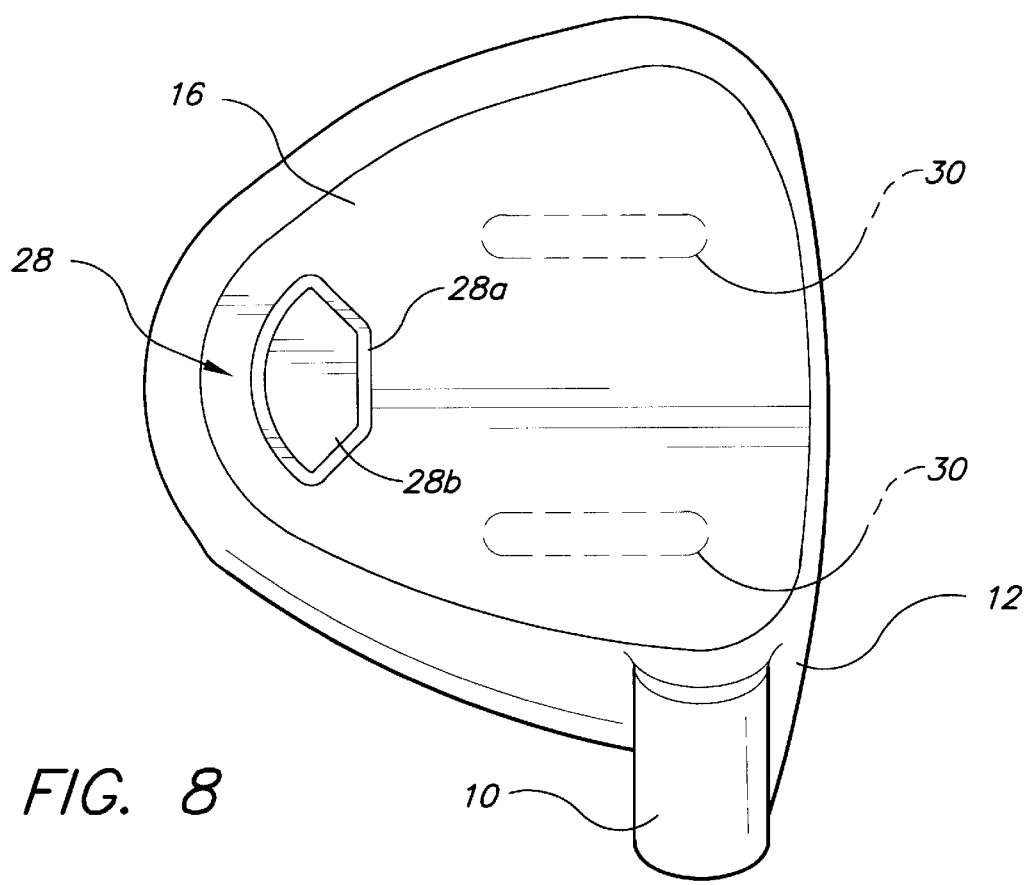
FIG. 8 is a bottom view of the golf club head according to the invention, illustrating perimeter weighting of the golf club head.

The shell 12 also comprises a sole 16 which is similarly mechanically wedded to the shell 12 by welding and machining (or brazing—see FIG. 8). The sole 16 is preferably formed as a single composite metal entity, depending on the weight requirements for materially balancing or weighting the club head, to reduce rotations in the club head 13 upon impact with a golf ball. The sole is preferably a hard metal comprising composite soft metals for weighting the golf club head 13 according to a desired weight distribution scheme for a particular user. This weighting technique in combination with the cushioned face improves the playability of both metalwood heads and golf iron heads by maximizing, weight distribution, moment of inertia, and reducing vibrations as desired by a user.

Figure 2:
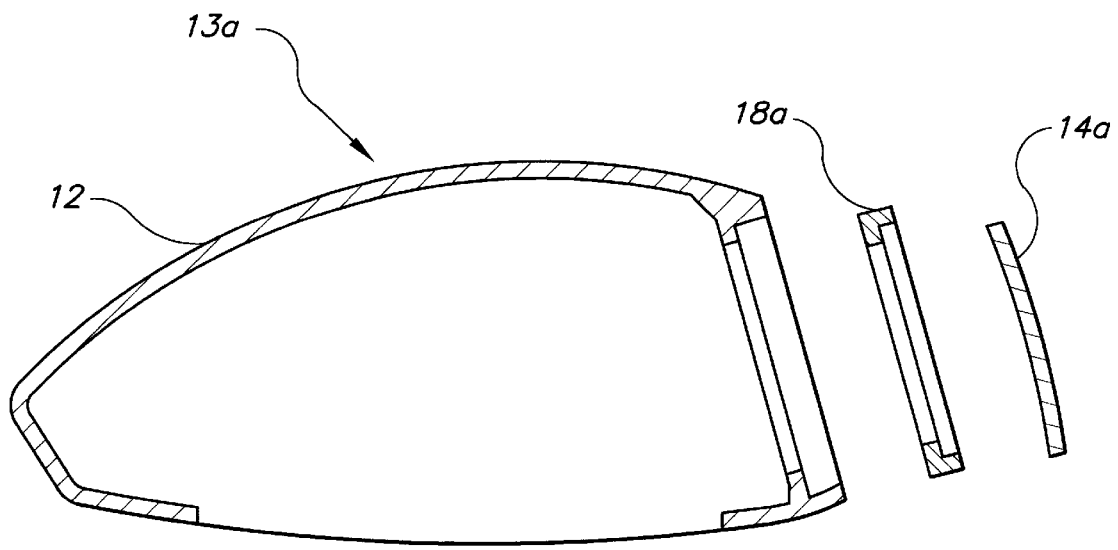
FIG. 2 is an exploded cross-sectional side-view of the golf club head according to a first embodiment of the invention.
Figure 3:
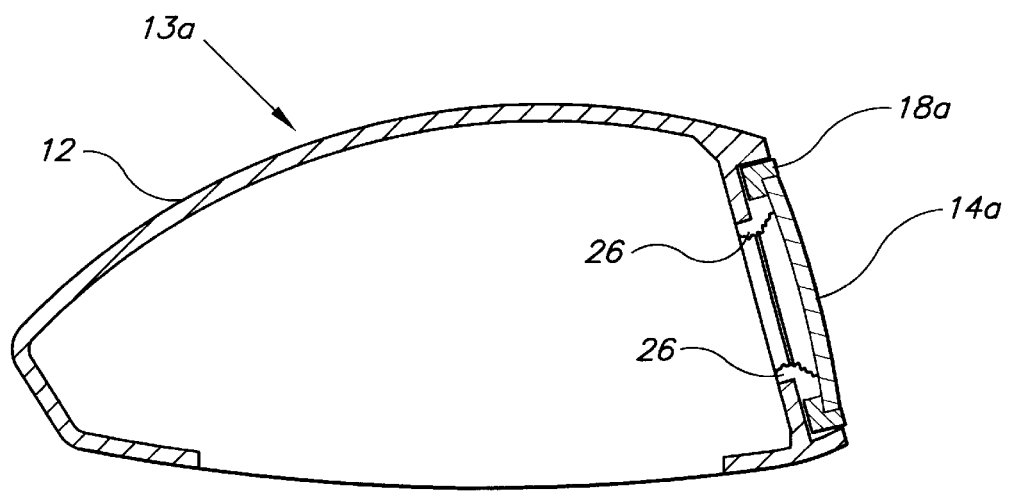
FIG. 3 is a perspective side view of FIG. 2, illustrating the packaged attachment of the hitting face or cushioned insert.

As diagrammatically illustrated in FIGS. 2–3, the club head 13a is shown in section, illustrating the attachment of the combination face-plate and ring or cushioned face to the shell 12 according to a first embodiment. As seen in FIG. 1, a thin face-plate 14a of hard metal material and ring 18a soft metal material is shown in exploded view. Face-plate 14a is designed with a thickness t to withstand low degrees of cyclical impact with a golf ball. In FIG. 2, the golf club 13a is shown in a packaged or wedded configuration; the cushioned face is secured by welds 26.

Figure 4:
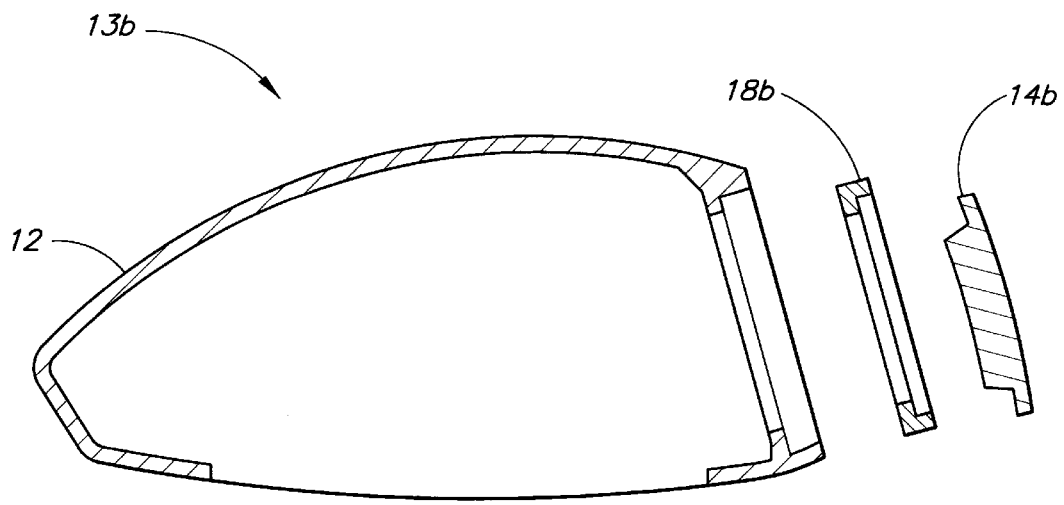
FIG. 4 is an exploded cross-sectional side-view of the golf club head according to a second embodiment of the invention.
Figure 5:
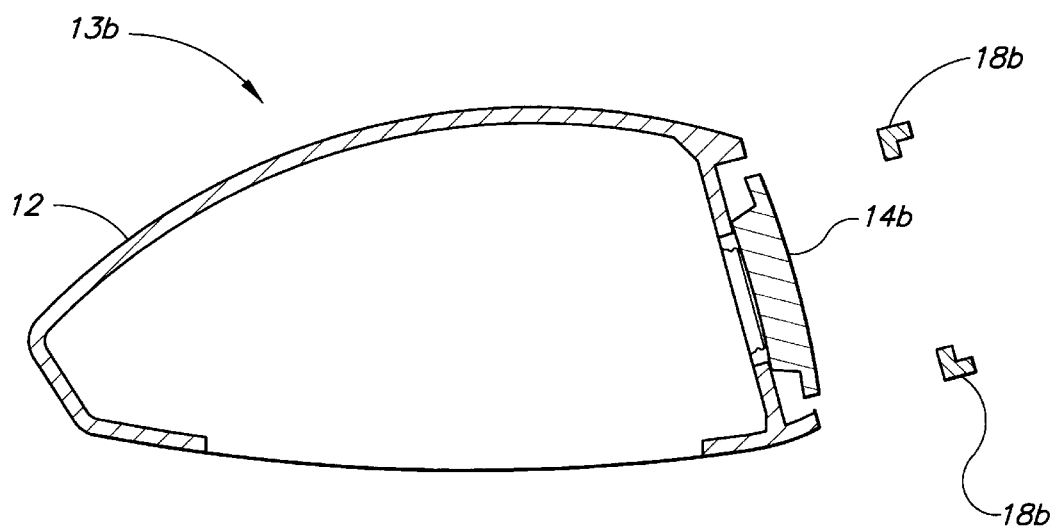
FIG. 5 is a view similar to FIG. 4, illustrating the packaged attachment of the hitting face or cushioned insert according to the second embodiment.

As diagrammatically illustrated in FIGS. 4–5, the club head 13b is shown in section, illustrating the attachment of the combination face-plate and ring or cushioned face to the shell 12 according to a second embodiment. As seen in FIG. 4, a face-plate 14b of hard metal material and ring 18b made of a soft metal material is shown in exploded view. Face-plate 14b is designed with a thickness t' to withstand medium degrees of cyclical impact with a golf ball. In FIG. 5, the golf club 13b is shown in a packaged or wedded configuration wherein the cushioned face is preferably secured by welds 26 (not shown). Other methods have can be used such as force pressing methods, however the effect of cyclical impacts deteriorates the life of the club.

Figure 6:
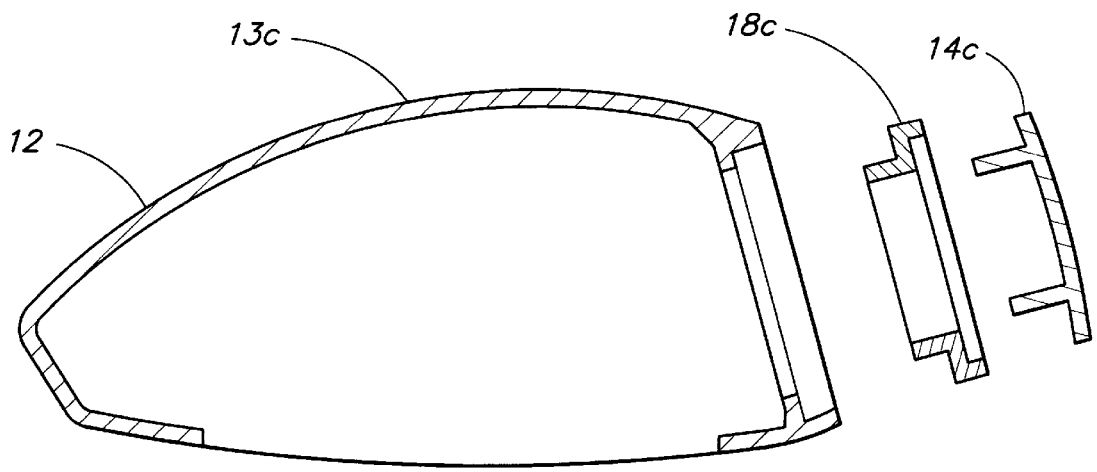
FIG. 6 is an exploded cross-sectional side-view of the golf club head according to a third embodiment of the invention.
Figure 7:
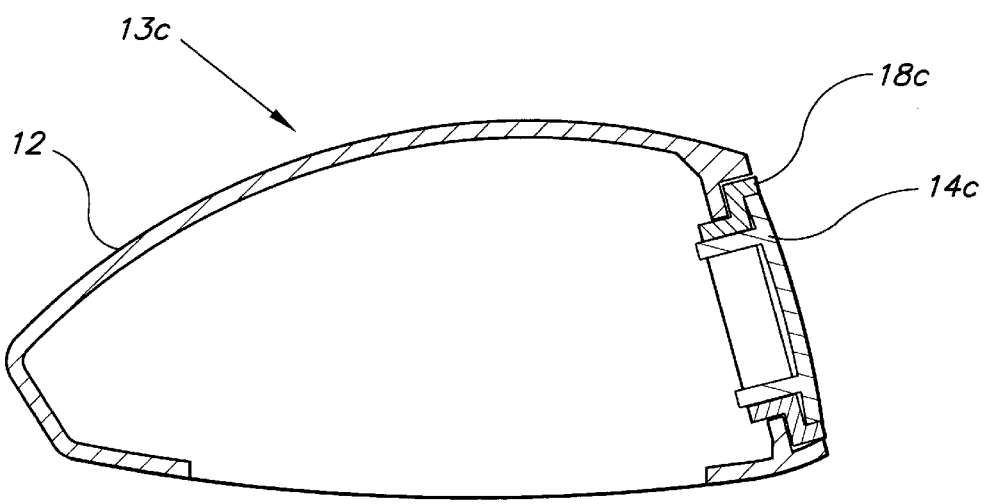
FIG. 7 is a view similar to FIG. 6, illustrating the packaged attachment of the hitting face or cushioned insert according to the third embodiment.

As diagrammatically illustrated in FIGS. 6–7, the club head 13c is shown in section, illustrating the attachment of the combination face-plate and ring or cushioned face to the shell 12 according to a second embodiment. As seen in FIG. 6, a face-plate 14c of hard metal material and ring 18c made of a soft metal material is shown in exploded view. Face-plate 14c is designed with a thickness t" to withstand high degrees of cyclical impact with a golf ball. Vibrations are not only attenuated vertically, but horizontally or in the direction of impact as well. In FIG. 6, the golf club 13c is shown in a packaged or wedded configuration wherein the cushioned face is preferably mechanically secured by welds 26 (not shown). Other mechanical securing methods can be used such as force pressing methods; however, the effect of cyclical impacts deteriorates the life of the club in this particular method alone. On the other hand, force pressing methods in combination with welds have been found to significantly improve the life of the club head 13. Weighting the club head 13 is another technique used for improving the playability of the golf club.

As best seen in FIG. 8, the club head 13 is weighted to reduce rotations upon impact at the crown or face of the club with a golf ball. The sole 16 is embedded a composite metal weight material 28 and two elliptical shaped weighted materials 30 having similar properties. The composite material is preferably a combination soft metal material 28a and a hard metal material 28b as recited above. The preferred single material is copper, but any similar material can be used. The shape of the weighted material can vary depending on the aesthetic appeal of a user. The weight material inserted into the sole 16 is wedded to the shell 12 in according to the processing method recited above.

Figure 9:
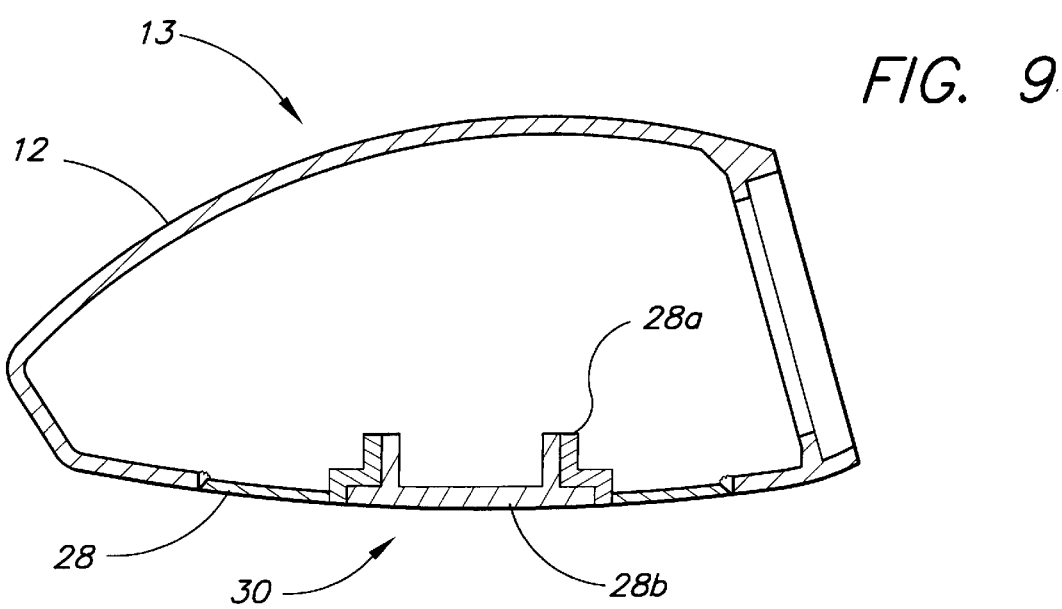
FIG. 9 is a cross-sectional side-view of the club shown in FIG. 8, illustrating the attachment of composite weighted inserts according to a first embodiment of the invention.
Figure 10:
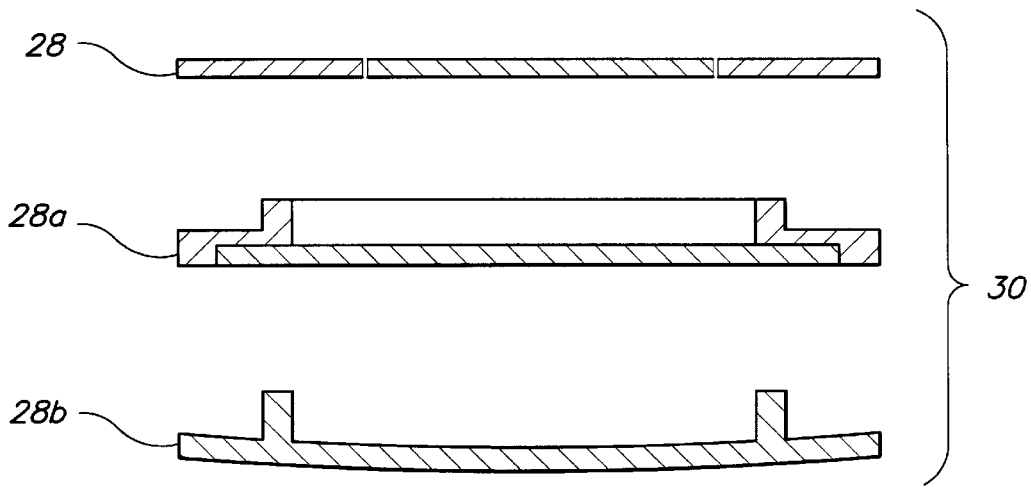
FIG. 10 is an exploded perspective view of the composite inserts of FIG. 9 according to the invention.
Figure 11:
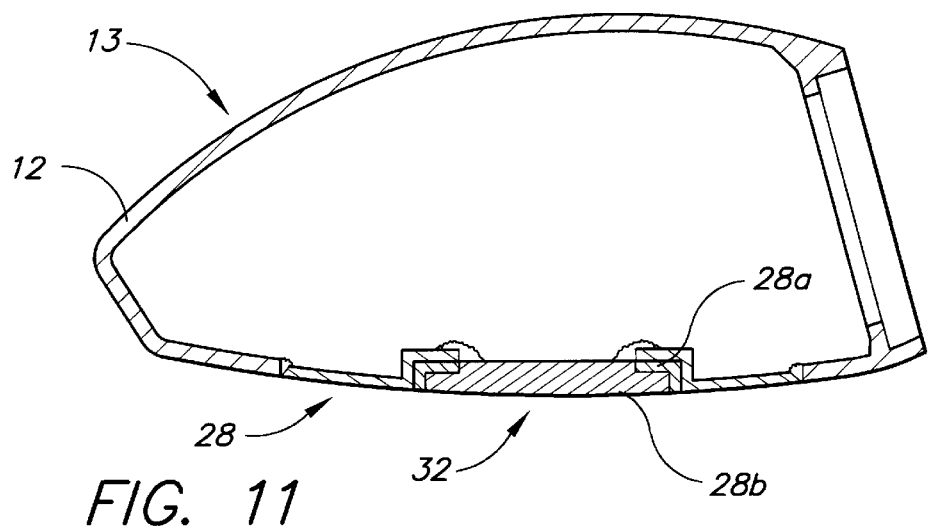
FIG. 11 is a cross-sectional side view of FIG. 8, illustrating the attachment of the composite weighted inserts according to a second embodiment of the invention.
Figure 12:
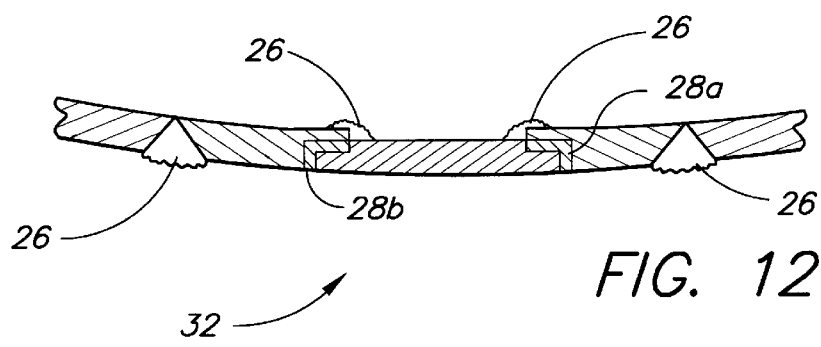
FIG. 12 is an exploded perspective view of the composite insert of FIG. 11 according to the invention.

As diagrammatically illustrated in FIGS. 9–10, the club head 13 is shown in section, having a composite weighted element 30 inserted within the sole 16 as illustrated in packaged and exploded view, respectively according to a first embodiment. FIGS. 11–12, illustrates in section a composite weighted element 32 similarly inserted within the sole 16 as recited above according to a second embodiment. The cushioned face arrangement has not been shown in combination since either arrangement shown in FIGS. 2–7 can be used depending on the playing characteristics of a particular user.

While there are different variations in producing the golf club head according to the instant invention the preferred method of making the improved golf club head include the following method steps of:

(a) shaping the shell having a recess and at least one opening for attaching of at least one metal plate thereto, (b) making a sole plate for wedded attachment to the shell, (c) making a metal face-plate for wedded attachment to the shell, (d) the step of making a metal face-plate as in step (c) further including the step of encasing said face-plate with a metal loop-like ring for wedded attachment to the recess of the shell, (e) the step of making a metal face-plate as in step (c) further comprising the step of forming a bridge made of a plurality of interlocking metal materials, (f) insertably attaching and welding the plates of steps (b) and (d) to the shell, (g) machining the plates of step (f), including the step of coating said plates to reduce wear from rust and corrosion.

(h) the method of making an improved golf club head according to step (e) wherein said step includes brazing.

(i) the making steps of step (b) and (c) further including the steps of sizing said sole and face-plate for a particular club head shell.

Notably, a person trained in the art will be very familiar with golf club heads combining two or more metals. And especially those golf club heads having high tensile strength metal alloys face inserts as well as those golf heads where inserts made of dense metal are used for improving a golf club head's weight distribution. It is quite common for metalwoods to have a stainless steel body, a titanium face insert or other material(s) such as tungsten carbide inserts in the sole.

Whether cast or forged, metalwoods and irons that utilize two or more metals in their construction, will usually rely on special inert gas jacket welding processes (brazing) to bond the two different metal alloys together in a single metalwood shell or iron golf head entity. Chemical and mechanical bonds have also been used in the past with some degree of success.

A person trained in the art will readily recognize that whether metalwood and iron golf heads, golf heads having two or more dissimilar metals are welded or chemically bonded together. This particular construction method is less than perfect, because the heterogeneous nature of the metals used can cause structural problem, resulting from different modulus of elasticity, thermal expansion coefficients, density and chemical composition. These material properties are directly related to premature failure of the golf club head under repeated impact.

It is to be understood that the present invention is not limited to the embodiments described above, but encompasses any and all embodiments within the scope of the following claims.

I claim:

1. A golf club head comprising:

the club head having a hosel, a shell with a recess, a striking face-plate, a sole and a single looped ring for encasing attachment with the striking face-plate, said striking face-plate encasement being mechanically wedded to the shell via the recess and made up of a bridge having at least one metal element interlocked and sealed within the face of the shell thereby producing a cushioned effect for attenuating vibrations upon impact with a golf ball;

the shell being mechanically wedded to the sole, said sole further comprising a plurality of material disposed within the sole of the shell for materially balancing the club head shell.

2. The golf club head according to claim 1, wherein said club head is a metalwood.

3. The golf club head according to claim 1, wherein said club head is an iron.

4. The golf club head according to claim 1, wherein the shell comprises at least one of stainless steel, aluminum or titanium.

5. The golf club head according to claim 1, wherein the looped ring is a soft metal made of at least one of copper, brass or aluminum.

6. The golf club head according to claim 1, wherein the striking face-plate is a hard metal made of at least one of maraging steel, stainless steel or titanium.

7. A method of making an improved golf club head comprising the method steps of:

(a) shaping the shell having a recess and at least one opening for attaching of at least one metal plate thereto, (b) making a sole plate for wedded attachment to the shell, (c) making a metal face-plate for wedded attachment to the shell, (d) the step of making a metal face-plate as in step (c) further including the step of encasing said face-plate with a metal looped ring for wedded attachment to the recess of the shell, (e) the step of making a metal face-plate as in step (c) further comprising the step of forming a bridge made of a plurality of interlocking metal materials, (f) insertably attaching and welding the plates of steps (b) and (d) to the shell, (g) machining the plates of step (f), including the step of coating said plates to reduce wear from rust and corrosion.

8. The method of making an improved golf club head according to claim 7, wherein the bridge of step (e) is formed by brazing.

9. The method of making an improved golf club head according to claim 7, wherein the method step (b) further includes the step of sizing the sole plate for wedded attachment to the shell.

10. The method of making an improved golf club head according to claim 7, wherein the method step (b) further includes the step of sizing the face-plate for wedded attachment to the shell.

* * * * *